United States Patent
Gonschorek

(10) Patent No.: US 10,812,002 B2
(45) Date of Patent: Oct. 20, 2020

(54) CONTROL SYSTEM FOR ELECTRIC MOTOR CIRCUIT

(71) Applicant: TRW Automotive GmbH, Alfdorf (DE)

(72) Inventor: Robert Gonschorek, Neuss (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 16/341,516

(22) PCT Filed: Oct. 13, 2017

(86) PCT No.: PCT/GB2017/053108
§ 371 (c)(1),
(2) Date: Apr. 12, 2019

(87) PCT Pub. No.: WO2018/069726
PCT Pub. Date: Apr. 19, 2018

(65) Prior Publication Data
US 2019/0372497 A1 Dec. 5, 2019

(30) Foreign Application Priority Data
Oct. 13, 2016 (GB) .................................. 1617387.4

(51) Int. Cl.
*H02P 21/13* (2006.01)
*H02P 21/22* (2016.01)
(Continued)

(52) U.S. Cl.
CPC ............. *H02P 21/13* (2013.01); *H02P 21/08* (2013.01); *H02P 21/22* (2016.02); *B62D 5/0463* (2013.01)

(58) Field of Classification Search
CPC ...... H02P 1/00; H02P 1/04; H02P 1/46; H02P 3/00; H02P 3/12; H02P 21/00;
(Continued)

(56) References Cited

U.S. PATENT DOCUMENTS 7,548,035 B2 * 6/2009 Endo ...................... B62D 5/046
318/400.02
7,574,294 B2 * 8/2009 Ta .......................... B62D 5/046
180/234
(Continued)

FOREIGN PATENT DOCUMENTS

| EP | 2012425 A1 | 1/2009 |
| EP | 2961058 A2 | 12/2015 |
| WO | 2016180469 A1 | 11/2016 |

OTHER PUBLICATIONS

Kim et al., "Effective Dead-Time Compensation Using a Simple Vectorial Disturbance Estimator in PMSM Drives", Transactions on Industrial Electronics, (2010), vol. 57, No. 5, pp. 1609-1614.
(Continued)

Primary Examiner — Antony M Paul
(74) Attorney, Agent, or Firm — Gigette M. Bejin

(57) ABSTRACT

A control system for an electric motor circuit comprises a current controller which produces a set of idealised voltage demands for the motor circuit, an observer which observes the inputs to the motor circuit and the outputs of the motor circuit and which generates from the observations estimates of the voltage disturbances within the motor circuit, the observer being arranged in use to output a first correction signal indicative of the voltage disturbances in the motor circuit, a feed-forward controller which receives as an input a measurement or estimate of the current flowing in the motor and calculates from the input a second correction signal. The first correction signal output from the observer and the second correction signal output from the feedfor-
(Continued)

ward controller are combined with the idealised voltage demands output from the controller to provide a set of modified voltages demands that are fed to the motor.

4 Claims, 2 Drawing Sheets

(51) Int. Cl.
*H02P 21/08* (2016.01)
*B62D 5/04* (2006.01)
(58) Field of Classification Search
CPC .......... H02P 21/08; H02P 21/13; H02P 23/00; H02P 25/00; H02P 27/00; H02P 27/04; H02P 27/06; G05B 19/408; G05B 11/01; G05D 23/275
USPC .... 318/400.01, 400.02, 400.14, 400.15, 700, 318/701, 727, 779, 799, 800, 801, 430, 318/432, 568.22, 632, 633, 638, 650
See application file for complete search history.

(56) References Cited

U.S. PATENT DOCUMENTS

| | | | |
|---|---|---|---|
| 2007/0007072 A1* | 1/2007 | Ta | B62D 5/046 180/446 |
| 2007/0107978 A1* | 5/2007 | Aoki | H02P 6/10 180/446 |
| 2009/0009127 A1* | 1/2009 | Imamura | G05B 13/025 318/601 |
| 2014/0265962 A1 | 9/2014 | Gebregergis et al. | |

OTHER PUBLICATIONS

Ludek et al., "Online Adaptive Compensation Scheme for Inverter Nonlinearlity in PMSM Drive", 7th International Congress on Ultra Modern Telecommunications and Control Systems and Workshops, (2015), pp. 166-171.
Patents Act 1977: Search Report under Section 17(5), Application No. GB1617387.4, dated Mar. 9, 2017.
PCT International Search Report and Written Opinion, Application No. PCT/GB2017/053108, dated Jan. 18, 2018.

\* cited by examiner

CONTROL SYSTEM FOR ELECTRIC MOTOR CIRCUIT

CROSS-REFERENCE TO RELATED APPLICATIONS

This application is a national stage of International Application No. PCT/GB2017/053108, filed 13 Oct. 2017, the disclosures of which are incorporated herein by reference in entirety, and which claimed priority to Great Britain Patent Application No. 1617387.4, filed 13 Oct. 2016, the disclosures of which are incorporated herein by reference in entirety.

BACKGROUND TO THE INVENTION

The present invention relates to a control system for a motor circuit arranged to reduce the effect of unwanted voltage disturbances in the electric motor circuit. It in particular but not exclusively relates to a control system for use in controlling an interior permanent magnet as part of an electric power assisted steering apparatus.

A closed loop current control system for a plant, such as a motor circuit or other electric actuator, typically takes the form shown in FIG. 1, where, using vector control, a demand voltage VDQ is applied to each phase winding of a motor 10 and the resultant generated currents, iMotor, measured by a current measurement circuit. The measured currents are then used by a current controller 20, typically a PI controller, to control the motor currents to the requested target current. The input to the PI controller is the difference between the target demand current iDQ and the actual measured current. The output of the controller is typically a set of motor demand voltages VDQ that are used to determine PWM waveforms that are applied to the drive bridge switches of a motor drive circuit. A signal which gives the electrical position of the motor is also required so that the voltages can be applied at the correct phases at the correct times. In the system of FIG. 1 a position sensor 30 is shown but the present invention is equally applicable to a position sensorless system, where the position signal is estimated from other sensor measurements.

It is well known that certain motor types can introduce electrical noise, as voltage disturbances, when the motor is rotating or being supplied with drive currents. Some of the key sources of noise are cross-coupling and Back-EMF which are inherent properties in motors such as Interior Permanent Magnet Synchronous Motors (IPMSM). These act as voltage disturbances within the motor control. If not adequately compensated, these voltage disturbances can severely degrade the static and dynamic performance of control.

SUMMARY OF THE INVENTION

According to a first aspect the present invention provides a control system for an electric motor circuit, the system comprising a current controller which produces a set of idealised voltage demands for the motor circuit, an observer which observes the inputs to the motor circuit and the outputs of the motor circuit and which generates from the observations estimates of the voltage disturbances within the motor circuit, the observer being arranged in use to output a first correction signal indicative of the voltage disturbances in the motor circuit, a feedforward controller which receives as an input a measurement or estimate of the current flowing in the motor and calculates from the input a second correction signal, and compensating means which combines both the first correction signal output from the observer and the second correction signal output from the feedforward controller with the idealised voltage demands output from the controller to provide a set of modified voltages demands that are fed to the motor.

By idealised voltage demands we mean a set of voltage demands that, with a perfect motor circuit, would cause the motor to produce a predetermined level of torque and speed. These voltage demands may be chosen based on the ideal physical parameters of the motor.

The first and second correction signals may comprise voltages, allowing them to be simply combined with the ideal voltage demands by addition or subtraction.

The control system of the invention provides for the compensation of voltage disturbances in the motor circuit (the motor and the motor drive stage and optionally the associated motor current measurement circuit) originating from cross-coupling, back-EMF, electrical parameter variation or uncertainty and other unknown sources. A control system in accordance with the invention may therefore be configured to achieve an excellent disturbance rejection over a wide bandwidth and offers robustness against unknown system disturbances, thereby providing an essential contribution to the accurate and highly dynamic control of the motor.

The input to the feedforward controller may comprise an estimate of the motor current produced by the observer, which may be expressed as a d axis current estimate and a q axis current estimate. This is preferred over using an actual measurement of the current output from a current sensor as the observer estimate has no lag, being derived directly from the instantaneous inputs fed into the observer.

The feedforward controller may employ a control law defined in a way to cancel the disturbance terms in the motor and motor driver corresponding to cross-coupling and back-EMF voltages based on knowledge about the process in the form of a mathematical model of the process and knowledge about or measurements of the process disturbances.

The feedforward controller may additionally receive as an input a measure of the angular velocity of the motor, either the mechanical or electrical angular velocity.

A feedforward controller operates based on an analytical calculation of the cross-coupling and back-EMF voltages using nominal inductance values set by a model of the motor. The benefits of providing the feed forward compensation include the ability to compensate for any disturbance from cross-coupling a back-EMF before they affect the motor output, as these effects can be modelled accurately for a given motor. However as it is based on an analytical model and calculation it cannot fully compensate where the motor deviates from the modelled behaviour of the motor. For example, the inductance values in the motor in a real system vary with the operating conditions affecting the measured current so the performance of the feedforward control degrades, thereby resulting in an excessive or reduced compensation. As a consequence, uncompensated voltage disturbances remain that negatively impact current control.

The applicant has further realised that the inclusion of the observer feeding into the feedforward controller overcomes these limitations as it is able to estimate what is happening in the motor circuit from observations of the inputs and outputs, even when these parameters are not directly measured or measurable.

This allows the control system to additionally compensate for: Voltage Disturbances due to Electrical Parameter Variation (motor resistance R, motor d-axis inductance Ld, motor q axis inductance Lq, motor back-EMF constant Ke); and other potential voltage disturbances.

Providing the additional second compensation term directly from the observer compensates for those disturbances which cannot be compensated by the feedforward controller.

The observer may be arranged to provide smooth estimates of the undelayed d- and q-axis motor currents with no sampling delay. The motor current signal input to the feedforward controller may also be provided from the observer and as such may have no sampling delay. This is advantageous over providing a current measurement to the feedforward controller from a current sensing means which will typically provide at least one sample delay.

The observer may comprise multiple observer circuits, each observing one or more parameters of the motor. Each observer circuit may include at least one linear observer with an integrator disturbance model.

The observer may be synthesized as linear quadratic estimators (LQE) (or optimal observers). Such observers may be configured to provide optimal estimates for the d- and q-axis currents and reconstruct unknown voltage disturbances based on the control inputs and measurement outputs.

The motor may comprise an Interior Permanent Magnet Synchronous Motor (IPMSM) of an EPS system.

The observer of the control system may be arranged to receive a current measurement signal, or current measurement signals, from a current sensing means arranged to produce a current sensing output indicative of electric current in the motor.

The controller, the feedforward controller, and the observers, may be arranged to produce signals in a frame of reference which is stationary, which may be the frame of reference of the windings and defined, for example, as α and β components, but it is preferred that they produce signals that are in a rotating frame of reference, which may be the frame of reference of the rotor, and defined, for example, as D and Q axis components.

The controller may comprise a PI controller.

The motor may comprise a three phase motor, and a current sensing means may be provided that comprises a single current sensor. The controller may be arranged to generate PWM voltage demand signals for the motor that include measurement times within the PWM periods that permit the current in each of the three phases to be determined from the output of the current sensor. These times will typically correspond to a first period of time when it is known that the current flowing through the current sensor is equal to the current in one of the phases and a second period of time in which the current flowing through the current sensor device is equal to the current flowing in a different one of the phases. The current in the third phase can then be determined easily as the sum of the currents flowing in the motor must be equal to zero.

Alternatively, the current sensing means may comprise a plurality of current sensors. For a three phase motor, there may be three current sensors. This allows the current in all three phases to be measured at once, removing the need for the special measurement times in each period.

The motor may have stationary windings and a rotor which rotates relative to the windings. The current sensing means may comprise a current sensor arranged to measure current in the motor windings. The current may be measured as two components in the frame of reference of the windings. The current sensing means may comprise transformation means arranged to transform the measured current into the frame of reference of the rotor, for example as torque-generating and non-torque-generating components.

Other advantages of this invention will become apparent to those skilled in the art from the following detailed description of the preferred embodiments, when read in light of the accompanying drawings.

DETAILED DESCRIPTION OF THE INVENTION

Figure 1:
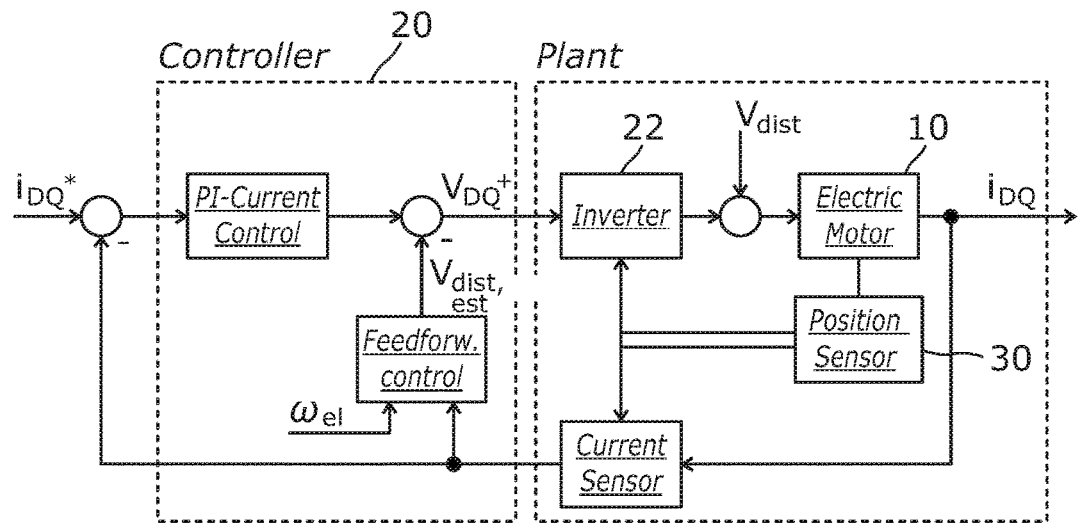
FIG. 1 is a diagram of a simple closed loop current control system for an electrical plant, such as an electric motor.
Figure 2:
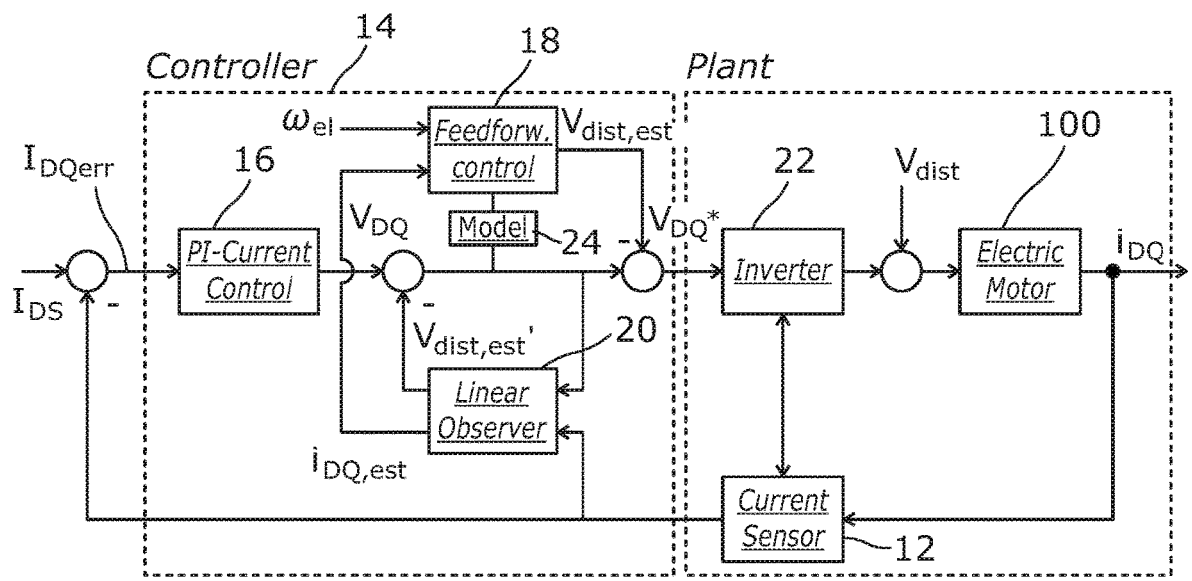
FIG. 2 is a corresponding diagram of an embodiment of a closed loop current control system in accordance with the present invention.

FIG. 2 shows an embodiment of a closed loop motor current control system in accordance with the present invention. In this example the motor 100 comprises an interior permanent magnet motor which forms part of an electric power assisted steering system. However, the invention can be applied to other motor types and systems other than power assisted steering systems.

The current control system comprises a current sensing system 12 and a current controller 14. The current sensing system 12 comprises a current sensor arranged to measure the currents $i_A$, $i_B$, $i_C$ in the three phases of the motor, which comprise stationary windings, and output a signal indicative of the current vector in the stationary coordinates having α and β components. The current sensing system 12 further comprises a coordinate transformation circuit arranged to convert the current vector from the α and β components in the stationary reference frame, to D and Q components $i_D$ and $i_Q$ defining the current vector in the rotor reference frame, which rotates relative to the fixed windings, with the Q axis current being orthogonal to the D axis current.

The current controller 14 includes a PI controller 16 that receives as a primary input a current error signal $I_{DQerr}$ which is obtained by combining a demanded current IDS with a measure or estimate of the actual motor current. Typically two methods of phase current measurement can be employed:

1. Phase current sensors, where a current measurement device is placed in each of the phases. (For a three phase system it may be that only 2 phases are measured as the 3rd phase can be calculated from the 2 measured phases.)

2. Single current sensor, where the current flowing in the DC link is measured at specific points during the PWM duty cycle to allow the current in the 3 phases to be calculated.

In the example embodiment the current is measured using a single current measurement sensor.

The PI controller 16 outputs an ideal motor demand voltage in the form of voltage vector, specifically in this embodiment in the form of a D and Q axis voltage demand signal $V_{DQ}$. The controller calculates a value of VDQ that reduces, ideally to zero, the current error $I_{DQerr}$ so that the measured current vector approaches the demanded current vector. As will be explained later this ideal voltage demand signal is further modified to produce an actual voltage demand signal which will compensate for disturbances in the motor and motor drive that cause it to behave in a non-ideal manner.

Figure 3:
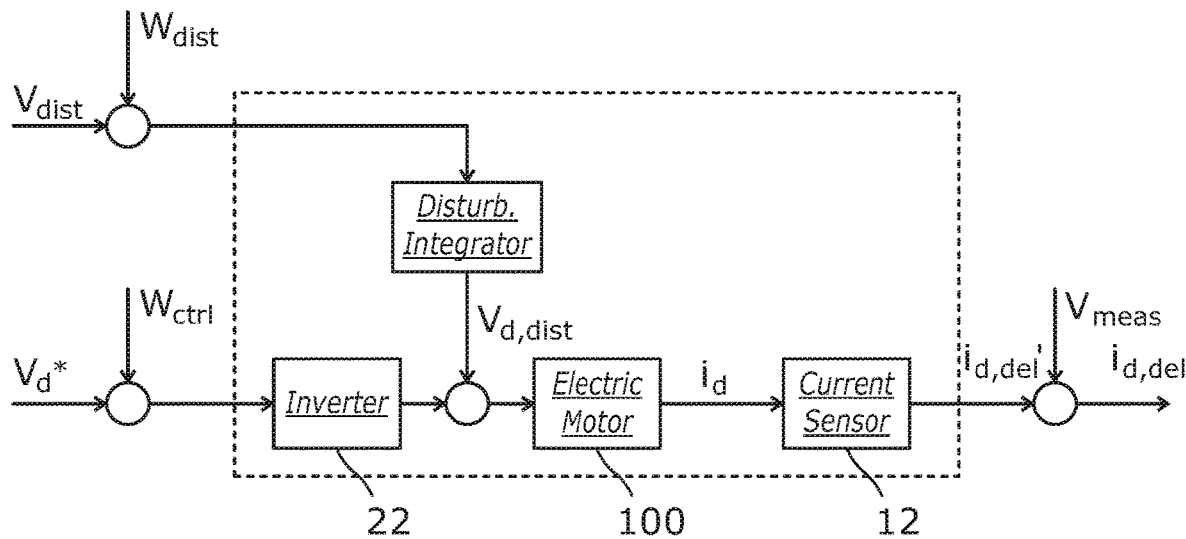
FIG. 3 is a diagram showing the Augmented D-Axis Electric Plant Model for LQE Design.

A further transformation circuit (not shown) receives the actual voltage demand signal and converts it to α and β components $V_{\alpha\beta}$ which are input to the motor and drive circuit. The drive circuit in this example comprises a PWM driver or inverter 22 which is arranged to control a number of switches to apply voltages to the phase windings of the motor in a PWM pattern which produces the net voltage in the windings having a magnitude and direction corresponding to the voltage demand vector. The switches may be arranged in a bridge with a top and bottom switch for each motor phase as shown in FIG. 3.

The modification of the ideal motor demand voltages to the actual motor demand voltages within the control system is performed by two separate sub-circuits which work together to form a compensation system. The two sub-circuits can be broken down into:

Sub-circuit 1: A Feedforward Control 18 for cross-coupling and back-EMF voltage compensation.

Sub-circuit 2: An Observer-Based Feedforward Control including a linear observer 20 for voltage disturbance compensation and for proving the input to sub-circuit 1.

These two sub-circuits produce respectively a first correction signal $V_{dist,est}$ and a second correction signal $V_{dist,est}'$. In use the first correction signal is subtracted from the ideal voltage demand signal to compensate for disturbances in the plant based on a predefined model 24 of the motor 100. In ideal operating conditions with a perfect motor that matches the model, this will remove most if not all of the errors. However, in practice some errors will not be removed as the motor will not perfectly match the model.

The second compensation signal is subtracted from this modified voltage demand signal to compensate for disturbances in the plant, thereby correcting the errors that the feedforward control does not correct with a non-ideal motor.

The feedforward control is based on an analytical calculation of the cross-coupling and back-EMF voltages using constant inductance and permanent magnet flux values. Therefore, it provides a highly dynamic compensation of nominal voltage disturbances from cross-coupling and back-EMF. In effect, the feedforward controller guesses what the errors may be according to the model, and generates a suitable compensation voltage.

In the real system, inductances and permanent magnet flux change with the operating conditions (e.g. temperature, load) or have some sort of variation due to Part-2-Part variation. Therefore, error is introduced to the feedforward compensation and uncompensated voltage disturbances remain that negatively impact current control (i.e. the feedforward control is not robust).

The sum of the remaining voltage disturbances and any other voltage disturbances affecting current control (e.g. error due to electrical parameter variation) can be reconstructed by linear observers with integrator disturbance models. Thereby, these disturbances become accessible for feedforward control and can be instantaneously compensated. Hence, robustness is ensured.

An additional benefit of the observer is that it provides smooth estimates of undelayed d- and q-axis current signals. Since measurement delay is in general restricting the performance of feedforward control (using delayed currents for the calculation of cross-coupling and back-EMF voltages gives delayed compensation terms for feedforward control and hence results in an inaccurate compensation in particular at high frequencies), this limitation can be overcome by using undelayed current estimates from the observers as an input to feedforward control. Thereby, the bandwidth of disturbance compensation can be significantly improved by using undelayed current estimates rather than measured currents for feedforward control.

In control terms the motor and motor drive circuit can be considered to be the plant, and may include additional circuitry located between the input for the actual voltage demand signals and the current signals output from the motor to the current sensor. This plant may include, for instance, the transformation circuit.

For the d- and q-axis two separate electric plant models may be defined. In these models the cross-coupling and back-EMF voltages are considered as unknown inputs. Thereby, fully linear time-discrete system models in state-space representation may be derived.

Design of a Suitable Observer

The observer may be synthesized as linear quadratic estimators (LQE) (or optimal observers). They provide optimal estimates for the d- and q-axis currents and reconstruct unknown voltage disturbances based on the voltage control inputs and current measurement outputs.

Figure 4:
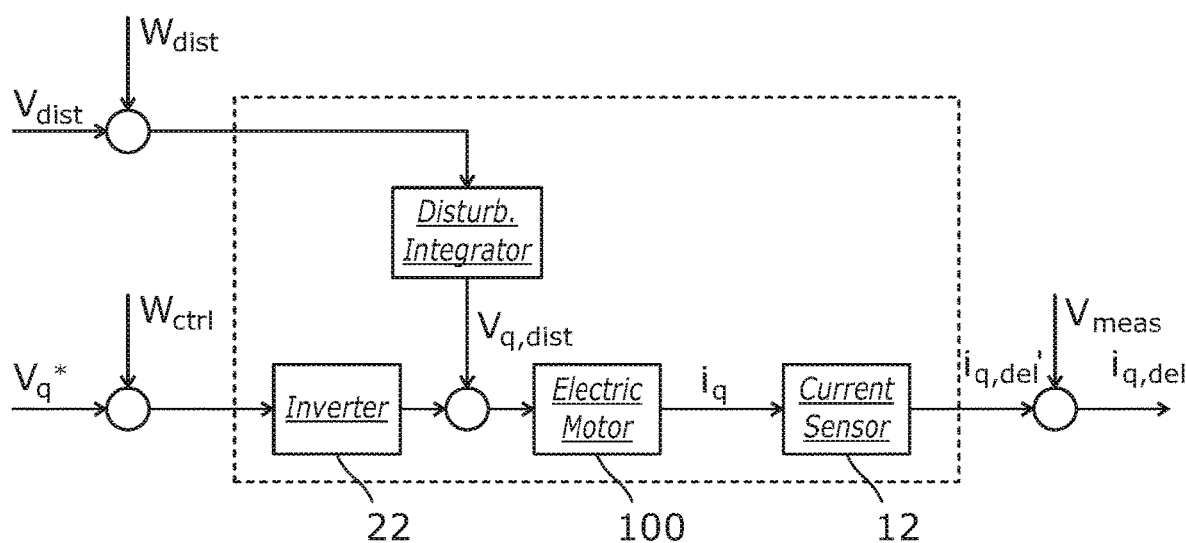
FIG. 4 is a diagram showing the Augmented Q-Axis Electric Plant Model for LQE Design.

Looking at FIG. 3 and FIG. 4, the objective of LQE design becomes clearer. The objective of the design is to find optimal estimates for the system plant states and for the unknown disturbance states in the presence of process and measurement noise. For example for a high level of process noise w(k) and a low level of measurement noise v(k), the estimator may rely more on the measurement signals than on the input signals for the state estimation and vice versa.

For the discrete implementation of the optimal observer, the current estimator form may be selected which corrects the state estimates using the most recent measurement samples. For the application of feedforward control this form is to be preferred, because it provides the fastest response to unknown disturbances or measurement errors.

The skilled reader will appreciate, from the teaching of this document, that the embodiment provides a motor controller arranged to provide for voltage disturbance compensation for a current controlled Interior Permanent Magnet Synchronous Motor (IPMSM), especially suitable for use in an electric assisted power steering system (EPS). The controller can in use compensate for voltage disturbances originating from cross-coupling, back-EMF, electrical parameter variation or uncertainty and other unknown sources. The applicant has appreciated that the Voltage Disturbance Compensation of the invention combines the advantages of a feedforward disturbance compensation (high dynamics) and an observer-based disturbance compensation (robustness) and may additionally provide other synergistic advantages.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A control system for an electric motor circuit, the control system comprising:
   a current controller which produces a set of idealised voltage demands for the motor circuit,
   an observer which observes inputs to the motor circuit and outputs of the motor circuit and which generates from the observations estimates of voltage disturbances within the motor circuit, the observer being arranged in use to output a first correction signal indicative, of the voltage disturbances in the motor circuit, a feedforward controller which receives as an input a measurement or an estimate of current flowing in a motor and calculates from the input a second correction signal, and a compensating means which combines both the first correction signal output from the observer and the second correction signal output from the feedforward controller with the idealised voltage demands output from the current controller to provide a set of modified voltages demands that are fed to the motor wherein the input to the feedforward controller corn rises an estimate of the motor current produced by the observer.

2. The control system for the electric motor circuit according to claim 1 in which the motor current signal input to the feedforward controller is provided from the observer with no sampling delay.

3. A control system for an electric motor circuit, the control system comprising:

a current controller which produces a set of idealised voltage, demands for the motor circuit, an observer which observes inputs to the motor circuit and outputs of the motor circuit and which generates from the observations estimates of voltage disturbances within the motor circuit, the observer being arranged in use to output a first correction signal indicative of the voltage disturbances in the motor circuit, a feedforward controller which receives as an input a measurement or an estimate of current flowing in a motor and calculates from the input a second correction signal, and a compensating means which combines both the first correction signal output from the observer and the second correction signal output from the feedforward controller with the idealised voltage, demands output from the current controller to provide a set of modified voltages demands that are fed to the motor wherein the feedforward controller additionally receives as an input a measure of an angular velocity of the motor, either the mechanical or electrical angular velocity.

4. A control system for an electric motor circuit, the control system comprising:

a current controller which produces a set of idealised voltage, demands for the motor circuit, an observer which observes inputs to the motor circuit and outputs of the motor circuit and which generates from the observations estimates of voltage disturbances within the motor circuit, the observer being arranged in use to output a first correction signal indicative of the voltage disturbances in the motor circuit, a feedforward controller which receives as an input a measurement or an estimate of current flowing in a motor and calculates from the input a second correction signal, and a compensating means which combines both the first correction signal output from the observer and the second correction signal output from the feedforward controller with the idealised voltage demands output from the current controller to provide a set of modified voltages demands that are fed to the motor wherein the observer is arranged to provide smooth estimates of undelayed d- and q-axis motor currents with no sampling delay.

* * * * *